United States Patent [19]

van den Bogert

[11] Patent Number: 4,524,488
[45] Date of Patent: Jun. 25, 1985

[54] APPARATUS FOR DISSECTING SLAUGHTERED ANIMALS

[76] Inventor: Andries J. E. van den Bogert, Hondsmesstraat 1, Hedel, Netherlands

[21] Appl. No.: 410,457

[22] Filed: Aug. 23, 1982

[30] Foreign Application Priority Data

Jan. 25, 1982 [NL] Netherlands .................. 8200252

[51] Int. Cl.³ ............................................. A22C 21/00
[52] U.S. Cl. ............................................ 17/11; 17/24; 17/44.1
[58] Field of Search .................. 17/24, 44.1, 44.2, 11, 17/52, 1 R; 198/680

[56] References Cited

U.S. PATENT DOCUMENTS

| | | | |
|---|---|---|---|
| 2,478,034 | 8/1949 | Zademach et al. ................. | 198/680 |
| 3,744,087 | 7/1973 | Vertegaal ............................ | 17/11 |
| 3,943,600 | 3/1976 | Cramer ............................... | 17/52 X |
| 4,228,709 | 10/1980 | Guzay, Jr. et al. ................. | 29/564.6 X |
| 4,275,495 | 6/1981 | Boutcher, Jr. et al. ............ | 29/861 X |
| 4,281,442 | 8/1981 | Senior et al. ....................... | 29/857 X |
| 4,290,179 | 9/1981 | Bakermans .......................... | 29/749 X |
| 4,351,110 | 9/1982 | Folk ..................................... | 29/749 |

Primary Examiner—Willie G. Abercrombie

[57] ABSTRACT

A process and apparatus for dissecting slaughtered animals, in particular poultry, in which process the animals are suspended from a conveyor system and moved past several treating stations where parts of the animals are cut off by motor-driven knives set in a fixed position, the animals being conducted in a predetermined position past each of the treating stations by means of guiding means. The guiding means may comprise two parallel rails and lamellar elements to which the hooks of the conveyor system have been attached. The lamellar elements are twisted and the rails have an incline relative to the direction of motion, so that the hooks are rotated around their vertical axis when required at a treating station.

12 Claims, 6 Drawing Figures

APPARATUS FOR DISSECTING SLAUGHTERED ANIMALS

BACKGROUND OF THE INVENTION

The invention relates to a process for dissecting slaughtered animals, in particular poultry in which process the animals are suspended from a conveyor system and moved past several treating stations where parts of the animals are cut off.

In the known process for dissecting slaughtered animals the cutting of the several treating stations was carried out by butchers who removed parts of the animals, for instance the wings of chickens, by hand. Since this known process, being substantially performed by hand, was an expensive one, it has been tried to find ways of conducting the process at least in part with the aid of machines. To this end, apparatus have been proposed in which parts of the animals are cut off with the aid of motor-driven knives.

The problem with such apparatus was that it proved impossible to cut off the animals' parts from the carcasses according to the so-called anatomical cut. In the anatomical cut, parts of the animals are severed without any damage being done to bony parts, that is to say, through the bursal ligaments of the articulation.

As the known process resulted in bony parts being damaged during the cutting, bone splinters were left in the meat, which is undesirable. In addition, the known process has the drawback that its permits only a limited rate of processing of the animals.

SUMMARY OF THE PRESENT INVENTION

It is the object of the present invention to eliminate these drawbacks of the known process and accordingly to provide a process of the type disclosed in the opening paragraph characterized in that the animals are conveyed with the aid of guiding means in a predetermined position past each of the treating stations and that at the treating stations parts of the animals are cut off by means of motor-driven knives set in a fixed position.

In this connection it is of particular importance that, because of the guidance and the setting of the knives the articulations are positioned such that the knife precisely cuts the bursal ligaments of the articulation and passes between the articulation knobs. This applies to both the cutting of the legs and the cutting of the wings.

It has been found that with the process according to the invention cutting of the animals' limbs through the bursal ligament of the articulation is achieved in 95% of all cases, hence without causing damage to bony parts. Moreover, the number of animals treated per man per hour proves to be two to three times greater than when using the known process.

According to the process of the invention, the animals to be dissected are preferably graded by weight in categories of 400 grams and the knives are set in a predetermined position for each weight category. In this way an even greater cutting precision can be achieved.

Furthermore, the process according to the invention has the advantage that the animals are guided such that the cutting direction of the knives at each of the treating stations virtually coincides with the direction of motion of the animals. The provision enables higher rates of processing to be achieved.

The invention furthermore provides an apparatus for dissecting slaughtered animals, especially chickens, comprising a conveyor system and several treating stations past which the animals are moved while suspended on hooks, characterized in that guiding means are provided for conducting the animals in a predetermined position past each of the treating stations.

The guiding means according to the invention preferably include two parallel rails and lamellar elements to which the hooks have been attached. These lamellar elements are guided between the parallel rails.

According to the invention it is advantageous for the lamellar element to be twisted and for the guiding means to show an incline relative to the horizontal direction of motion so that the hook can rotate round a vertical axis.

According to the invention, bottom guiding means which may run at an incline may also be provided.

DESCRIPTION OF THE DRAWINGS

The process and the apparatus according to the invention will now be described by reference to an example represented in the accompanying drawings, in which.

DETAILED DESCRIPTION OF THE PREFERRED EMBODIMENT

Figure 1:
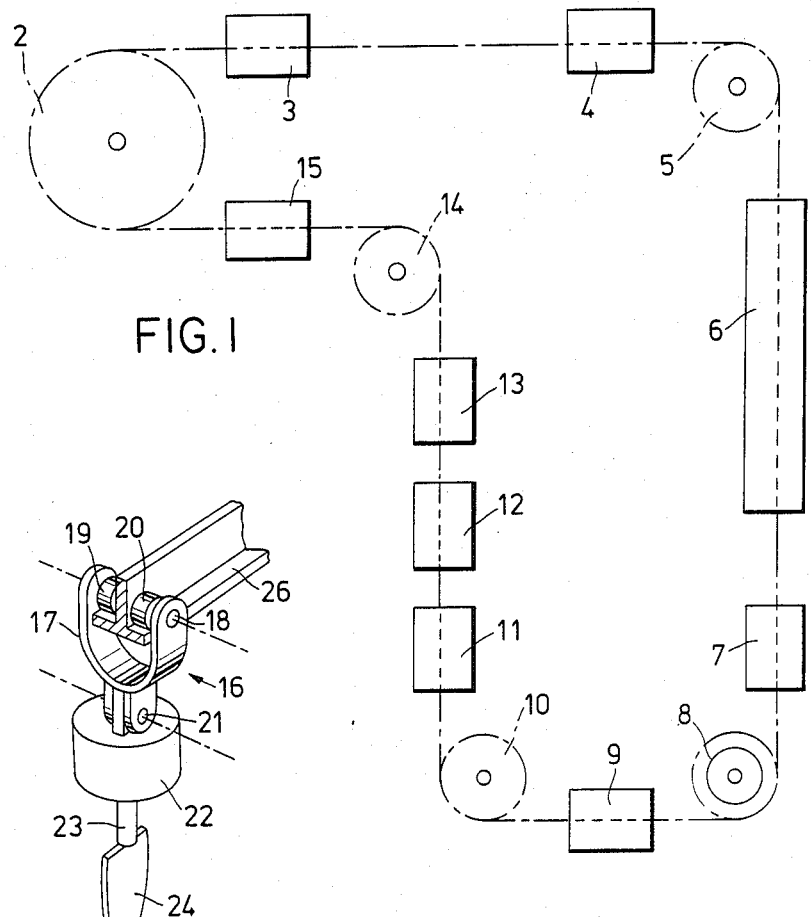
FIG. 1 is a diagrammatic top view of the apparatus according to the invention for dissecting slaughtered animals.

FIG. 1 gives a diagrammatic top view of the apparatus according to the invention. The animals, for instance chickens, are conducted by means of a conveyor system past a number of treating stations where different parts of the animals are cut off. The example of the apparatus according to the invention depicted in FIG. 1 is intended for cutting slaughtered chickens to pieces. The invention is not, however, limited to this specific use but equally applicable to dissecting other animals.

Figure 2:
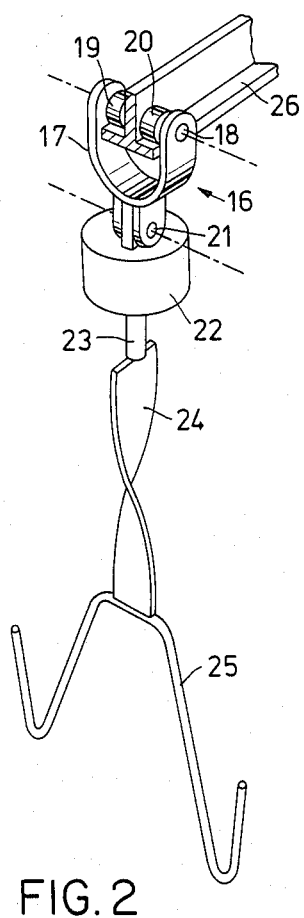
FIG. 2 depicts a means of conveyance that is used according to the invention for moving the animals along the conveyor system.

The chickens to be cut up are moved along the conveyor line 1 with the aid of a means of conveyance represented in FIG. 2. The conveyor line may comprise a tightener 2 for tensioning of the conveyor chain. The reference numeral 3 denotes an intake station where the chickens are hung by the legs on the hooks 25 (FIG. 2). The chickens are moved past a wing-tip cutter 4 where the wing tips are cut off with the aid of an assembly of motor-driven knives represented in FIG. 4. Next, the chickens are passed via a corner wheel 5 to a filleting station 6 where the breast meat is removed from the chickens. The reference numeral 7 denotes a wing cutter which severs the wings from the chicken. Then, the chickens are passed on via a drive 8 to a tail saw 9 which removes the tail part from the chickens. Via a corner wheel 10 the chickens subsequently reach a carcass saw 11 which cuts off the part of the carcass above the legs. The reference numeral 12 denotes a leg saw which severs the legs from the chicken. A drum stick saw 13 cuts off the lower joints of meat from the legs. Via a corner wheel 14 the remaining parts of the chicken, the joints of meat, arrive at the packaging station 15 where they are packed in boxes.

From the preceding it will be clear to those skilled in the art that during the operations at the several treating stations the chicken has to be tilted and turned and otherwise moved past the knives in a precisely determined position. To achieve this, the invention provides for a means of conveyance represented in FIG. 2. This means of conveyance comprises a trolley 16, which is moved along a T-shaped rail 26 and driven with the aid of a chain—not shown—which is pulled by the drive 8 (FIG. 1). The trolley 16 has a loop 17 provided with spindles 18 on which the wheels 19 and 20 run. The loop 17 is also provided with a spindle 21 which can rotate in the pivot bearing 22. The lamellar element 24 to which the hook 25 is attached can rotate with a shaft 23 in the pivot bearing 22. The means of conveyance according to FIG. 2 therefore allows the chicken to rotate around its verticle axis and to be tilted on its horizontal axis. The construction of the means of conveyance according to FIG. 2 is otherwise relatively arbitrary, but great interest attaches to the way in which in conjunction with FIG. 3a a rotation around the vertical axis and in conjunction with FIG. 3b a tilt on the horizontal axis is accomplished.

Figure 3A:
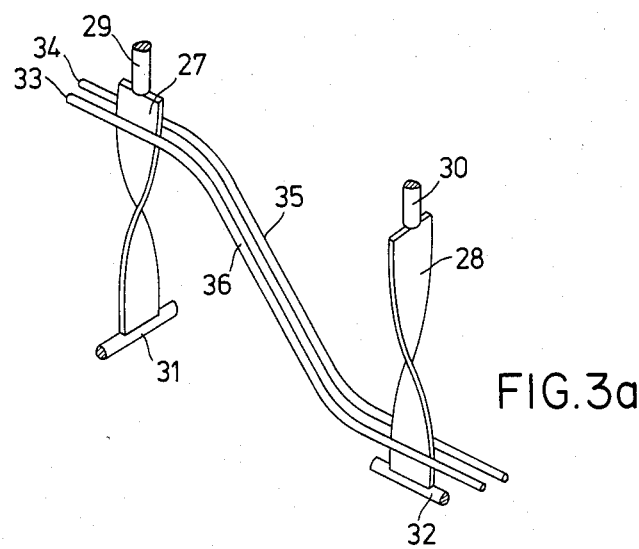
FIG. 3a, 3b and 3c show details of the guiding means according to the invention.
Figure 3B:
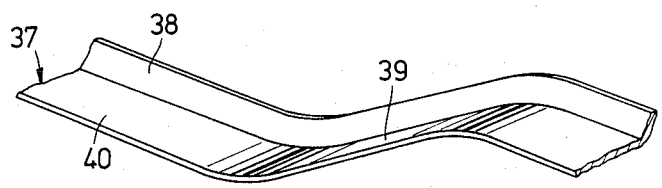

The FIGS. 3a and 3b show details of the guiding means employed according to the invention. The lamellar element 27, which has been twisted through 90°, carries a hook 31 (represented partially) and is attached to the shaft 29 which can rotate in a bearing (not shown). The guiding rails 33 and 34 have inclined sections 35 and 36, causing the lamellar element 27 and therefore also the hook 31 with the chicken hung on it to be rotated through 90° during transport. It is in this position that the lamellar element 28 with the shaft 30 and the part of the hook 32 is represented. For instance, in the position of the lamellar element 27 the wing tips may be removed by means of knives disposed in parallel to the direction of motion, whereas the chicken's tail part may be cut off in the position of the lamellar element 28.

FIG. 3b represents a bottom guiding means 37 which may be mounted at a treating station underneath the conveyor system 1 at such a distance that the tail part of the chicken to be dissected just touches the horizontal section 40. The guiding means 37 may be provided on both sides with a raised edge 38 so as to prevent the chicken to be treated from going wrong. When the tail part of the chicken runs upon the incline 39, the means of conveyance (FIG. 2) will turn on the spindle 21, causing the chicken to assume a tilted position. This tilted position is especially advantageous to the cutting of the chicken's wings.

Figure 3C:
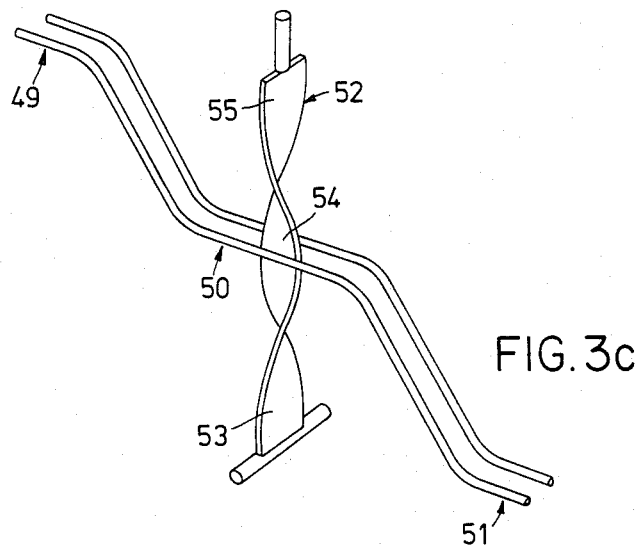

FIG. 3c depicts an alternative embodiment of the guiding means and the lamellar element according to the invention. The guiding means comprise first, second and third horizontal sections 49, 50 and 51, which occur at different levels and have lengths chosen arbitrarily. Between the horizontal sections inclined sections are present. The lamellar element is twisted in different directions, when viewed from the central position of the lamellar element 52. When the lamellar element is in the horizontal section 49, the hook is turned through 90° relative to the position represented in FIG. 3c, but when the lamellar element is in the horizontal section 51, the hook has been turned through 90° in the opposite sense relative to the position shown in FIG. 3c.

The lamellar element 52 has a flat center part 54 and flat end parts 53 and 55. Likewise, the lamellar element 24 in FIG. 2 and the lamellar elements 27 en 28 in FIG. 3a have flat end parts. By this design it is ensured that, even if the level of the horizontal parts 49, 50 and 51 should vary somewhat near the knives, the chickens are nonetheless conducted past the knives at a fixed angle.

Figure 4:
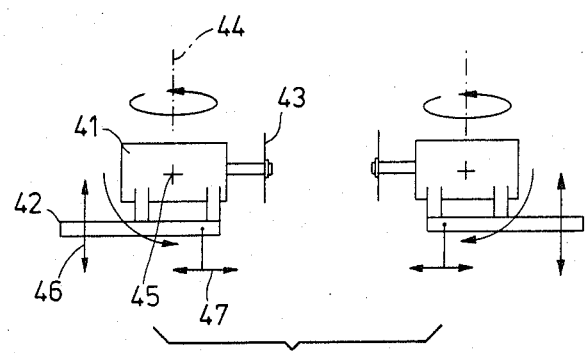
FIG. 4 is a schematic view of the arrangement of the motors and knives employed according to the invention.

FIG. 4 presents a schematic view of the arrangement of the motor-driven knives, as applied in the apparatus according to the invention. The reference numeral 41 denotes a motor mounted on a slide 42. The motor 41 drives a circular knife 43. The motor 41 is positioned such as to be rotatable both about a vertical axis 44 and about a horizontal axis 45. In addition, the motor slide 42 can be displaced up and down in the direction of of the vertical arrow 46 and adjusted in the direction of the horizontal arrow 47. The reference numeral 48 indicates the direction of motion of the animals to be dissected. It will be clear that the animals can be cut up with precision because of the adjustability of the knives.

Obviously, many variants are possible within the purview of the invention and the embodiments represented in the drawings are only examples. For instance, the arrangement according to FIG. 1 can be conceived on quite different lines, whilst certain details of the means of conveyance according to FIG. 2 may also be designed differently. Thus, the lamellar element (27, 28, 52) may consist of a set of flat strips which have been welded into a square and subsequently twisted.

The most important advantage of the process and the apparatus according to the invention is that a high rate of processing can be achieved, whilst, in addition, cutting can be done with precision according to the anatomical cut.

It has been found that the precision of the process and the apparatus according to the invention is such that 95% of the animals are dissected in identical fashion according to the anatomical cut. A great precision is attained in particular when classification into weight categories is applied according to the invention. Chickens are preferably graded according to the invention in weight categories of 600–1000, 1050–1450 and 1500–2000 grams.

The process and the apparatus according to the invention enable a team of six workers to dissect 1250 chickens per hour, whereas with the known process and apparatus only 900 chickens per hour can be cut by a team of eleven workers. Also, the apparatus according to the invention can be adjusted simply and quickly to a different weight category.

According to another embodiment of the invention the apparatus may comprise a provision for severing the legs from the carcass, consisting of one or more additional guiding rails which may have an incline. As the carcass passes station 12, for the cutting of the legs, such additional guiding rails depress the carcass, so that the articulation are stretched. This provision is necessary to impart the proper pulling power to the articulation such that the bursal ligaments are sufficiently strained for the knife to have an opportunity to pass between the articulation knobs. The additional guiding rails are mounted in parallel to the T-profile at such a height that they run between the hook 25 and the chicken's carcass during the passing of the chicken.

What I claim is:
 1. An apparatus for dissecting slaughtered animals comprising:
  a conveyor adapted to transport a slaughtered animal along a transport path through plural treating stations;

a pair of spaced parallel rails extending along the transport path of said conveyor;

a lamellar element disposed and adapted for movement between said rails, said lamellar elements having a first end mounted to said conveyor to engage said rails to rotate said lamellar element for guiding said slaughtered animal along said conveyor in predetermined orientational positions through each of said plural treating staions;

a hook depending from a second end of said lamellar element for suspending the slaughtered animal;

motor driven knives positioned at each of said plural treating stations for cutting off particular parts of said slaughtered animal when said salughtered animal is positioned in each of said predetermined orientation positions;

said lamellar element including a twisted central portion and said pair of rails being disposed in a generally horizontal plane along the transport path of said conveyor except adjacent each of said plural treating stations wherein said pair of rails are disposed at an angular orientation relative said horizontal plane, so that transport of said lamellar element between said pair of rails along the transport path of said conveyor rotates said slaughtered animal about said lamellar element into each of said predetermined orientation positions.

2. The apparatus of claim 1 further comprising:

means for supporting the other end of said slaughtered animal suspended on said hook along the transport path of said conveyor.

3. The apparatus of claim 2 wherein said supporting means comprises an inclined surface disposed within at least one of said treating stations adapted to dispose said slaughtered animal at an angle to the vertical past said motor driven knives.

4. The apparatus of claim 1 wherein said motor driven knives are positioned at each of said treating stations by means for adjusting the horizontal and vertical position of said knives relative the transport path of said conveyor.

5. The apparatus of claim 4 wherein motor driven knives are rotatable.

6. The apparatus of claim 20 further comprising means for stretching the articulations of the legs of said slaughtered animal during transport of said animal along said conveyor.

7. An apparatus for dissecting slaughtered animals, comprising:

a conveyor adapted to transport a slaughtered animal suspended adjacent on end upon a hook through plural treating stations;

means for guiding said slaughtered animal along said conveyor in predetermined orientation positions through each of said plural treating stations, said guiding means including:

a pair of spaced parallel rails extending along the transport path of said conveyor;

a lamellar element disposed and adapted for movement between said rails and attached to said hook suspending said slaughtered animals, said lamellar element including a twisted central portion and said pair of rails being disposed in a generally horizontal plane along the transport path of said conveyor except adjacent each of said plural treating stations wherein said pair of rails are disposed at an angular orientation relative to said horizontal plane, so that transport of said lamellar element between said pair of rails along the transport path of said conveyor rotates said slaughtered animal about said lamellar element into each of said predetermined orientational positions; and motor driven knives positioned at each of said plural treating stations for cutting off particular parts of said slaughtered animal when said slaughtered animal is positioned in each of said predetermined orientation positions.

8. The apparatus of claim 7 further comprising:

means for supporting the other end of said slaughtered animal suspended on said hook along the transport path of said conveyor.

9. The apparatus of claim 8 wherein said supporting means comprises an inclined surface disposed within at least one of said treating stations adapted to dispose said slaughtered animal at an angle to the vertical past said motor driven knives.

10. The apparatus of claim 7 wherein said motor driven knives are positioned at each of said treating stations by means for adjusting the horizontal and vertical position of said knives relative to the transport path of said conveyor.

11. The apparatus of claim 10 wherein motor driven knives are rotatable.

12. The apparatus of claim 1 further comprising means for stretching the articulations of the legs of said slaughtered animal during transport of said animal along said conveyor.

* * * * *